Figure 4:
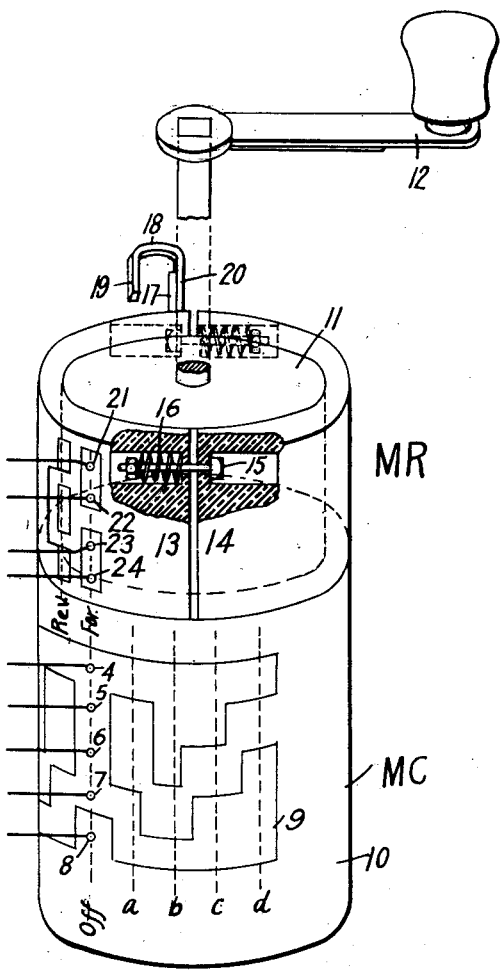

L. G. RILEY.
CONTROL SYSTEM.
APPLICATION FILED MAY 6, 1915.
1,311,462.
Patented July 29, 1919.
2 SHEETS—SHEET 1.
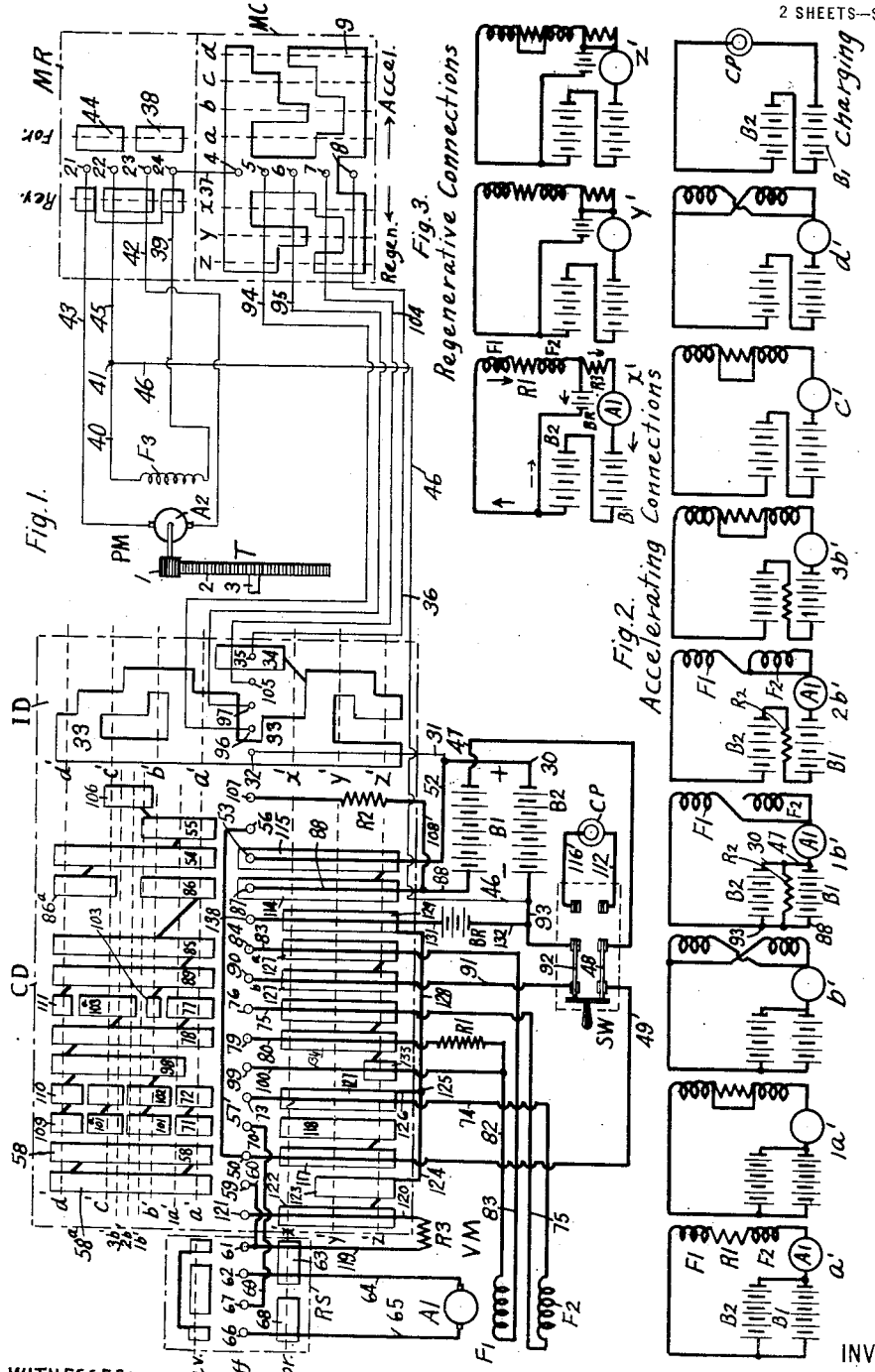
WITNESSES:
INVENTOR
Lynn G. Riley
BY
ATTORNEY

L. G. RILEY.
CONTROL SYSTEM.
APPLICATION FILED MAY 6, 1915.

1,311,462.

Patented July 29, 1919.
2 SHEETS—SHEET 2.

WITNESSES:

INVENTOR
Lynn G. Riley
BY
ATTORNEY

UNITED STATES PATENT OFFICE.

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,311,462.     Specification of Letters Patent.     Patented July 29, 1919.

Application filed May 6, 1915. Serial No. 26,307.

*To all whom it may concern:*

Be it known that I, LYNN G. RILEY, a citizen of the United States, and a resident of Wilkinsburg, in the county of Allegheny and State of Pennsylvania, have invented a new and useful Improvement in Control Systems, of which the following is a specification.

My invention relates to systems of control, and it has special reference to the remote control of electric-vehicle motors and the like.

One of the objects of my invention is to provide a control system of the above-indicated character which shall embody relatively inexpensive and compact apparatus and which shall be effective and reliable in operation.

Another object of my invention is to provide a multi-position switching device for electric motors, of a novel type which shall be relatively inexpensive to manufacture and to maintain in operation.

A further object of my invention is to provide means associated with the auxiliary driving motor of a main-circuit controller for automatically effecting the return of the controller to its initial position upon backward movement of the switching device for governing the driving motor.

In the prior art, multi-position switching devices of the type embodying a plurality of control fingers and a coöperating contact segment, it has been customary to provide an additional control finger for each successive position of the controller, thereby requiring a relatively large number of fingers in many cases. By employing the construction hereinafter described, wherein various sub-combinations of the control fingers are utilized, the number of fingers necessary and the size of the apparatus are materially reduced. Moreover, in the case of motor-driven controllers, it has heretofore been necessary when it was desired to return the controller to its initial position, to manually manipulate a reverser or other device independently of the backward operation of the governing switching device for the controller-driving motor in order to effect the desired result, thus necessitating additional movements of the operator, and also sometimes introducing an undesirable time element, either inherently or by reason of the negligence of the operator, in returning the controller to its initial position to allow coasting or electric braking of the vehicle.

According to my present invention, the operator is required to make only the usual backward movement of the auxiliary switching device, whenever desired, to immediately and automatically effect the reversal of the controller of the driving motor and to return the controller to its initial position, without further attention from the operator.

In the accompanying drawing, Figure 1 is a diagrammatic view of the complete electrical and mechanical connections of a system of control embodying my invention; Fig. 2 consists of a set of simplified diagrams illustrating various main-circuit accelerating connections; Fig. 3 consists of a set of similar diagrams illustrating successive main-circuit connections during regenerative operation; Fig. 4 is a detailed diagrammatic view of the construction of one of the pieces of control apparatus that is employed in connection with my invention.

Referring to Fig. 1, the system here shown comprises a source of energy such as a plurality of battery sections B1 and B2; a suitable double-pole, double-throw switch SW that is adapted when in one position to connect the battery sections to the control system, and when thrown in the other direction to connect the battery sections to a suitable charging plug CP; a vehicle motor VM provided with an armature A1 and series-connected field-magnet winding sections F1 and F2; a reversing switch RS for reversing the electrical relations of the armature and field windings of the vehicle motor; a main-circuit switching device or control drum CD for the vehicle motor that is adapted to occupy a plurality of operative positions $a'$ to $d'$, inclusive, when operated in one direction to effect acceleration of the motor, and a plurality of operative positions $x'$, $y'$ and $z'$, when the controller is operated in the reverse direction to effect regenerative operation of the system; an interlocking drum ID that is movable with the controller drum CD; a suitable pilot motor PM that is provided with an armature winding A2 and a shunt-connected field winding F3; a transmission means T for suitably imparting the movement of the pilot motor PM to the main-circuit control drum CD; a switching device in the form of a master controller MC for the pilot motor that is adapted to occupy an intermediate neutral or off position, a plurality of operative positions $a$ to $d$, inclusive, in one direction, corresponding to the acceleration of the vehicle motor and a plurality of positions $x$, $y$ and $z$, when operated in the reverse direction from the off position, that correspond to regenerative operation of the vehicle motors, the master controller MC and the interlocking drum ID being electrically associated in a manner to be described; a master reverser MR for the pilot motor that is associated with the master controller MC in a manner to be described in connection with Fig. 4, the master reverser being adapted to occupy two positions that respectively correspond to forward and reverse operation of the pilot motor PM; a main-circuit resistor R1 that is employed during both acceleration and regeneration; a plurality of other main-circuit resistors R2 and R3 that are respectively employed during accelerating and regenerative operation only; and a battery section BR, comprising a relatively small number of cells, that is employed for exciting the vehicle-motor field windings during regenerative operation.

The transmission means T is herein shown as comprising a suitable pinion 1 that is secured to the shaft of the pilot motor PM and that is adapted to mesh with a gear wheel 2 which is mounted upon the operating shaft 3 of the drums CD and ID, the relative speed of the control drum being thus reduced to a suitable value, as will be understood.

Reference may now be had to Fig. 4 which illustrates the mechanical relation of the master reverser MR to the master controller MC. The master controller comprises a plurality of control fingers 4, 5, 6, 7 and 8 that are adapted to be bridged in various sub-combinations by a contact segment 9 as the master controller is moved through its successive positions, the contact segment 9 being disposed upon the main body-portion 10 of the controller, in a well-known manner. The body-portion 10 is provided with an upwardly-extending, concentrically-disposed, cylindrical projection or boss 11 of smaller diameter than the body portion, and a suitable handle member 12 that is associated with the boss 11 for rotatively moving the master controller. The master controller MR comprises a pair of similar semi-annular members or plates 13 and 14 that collectively inclose the boss 11 and are held in frictional engagement therewith by means of a plurality of bolts 15 and suitably associated spring members 16 that are disposed near the adjacent ends of the semi-annular members. The member 13 is provided with a projecting arm or pin 17, and a U-shaped stop member 18 that is provided with arms 19 and 20, the distance between which corresponds to the arc between the forward and reverse positions of the master reverser, is associated with the stationary frame of the controller (not shown) in any suitable manner.

The master reverser is also provided with the usual control fingers 21, 22, 23, 24 and suitable operating contact segments therefor, as hereinafter more fully set forth.

Assuming that the master reverser MR occupies its position corresponding to forward operation of the pilot motor, the mechanical operation of the master reverser with respect to the master controller may be set forth as follows: Upon movement of the controller handle 12 in the clockwise direction indicated by the arrow, the master controller moves through its successive positions, but the master reverser is not actuated because of the engagement of the pin 17 and the arm 20 of the U-shaped stop member 18. However, as soon as the master controller is given a backward movement from any of its operative positions, the master reverser is immediately actuated to its reverse position by reason of the frictional engagement above referred to, until the pin 17 engages the opposite arm 19 of the U-shaped stop member; and the master reverser maintains this reversed position throughout any further operation of the master controller in the backward direction. Consequently, the pilot motor is reversed immediately upon the backward movement of the master controller to return the control drum CD to its initial position. It will be understood that the reverse operation takes place when the master controller is moved toward its intermediate position after having been actuated in the reversed or regenerative position with the master reverser also occupying its reverse position.

The mechanical construction of the device just described forms no part of my present invention, and is fully set forth and claimed in a co-pending application of Norman W. Storer, Serial No. 774,394, filed June 18, 1913, and assigned to the Westinghouse Electric and Manufacturing Company.

Assuming that the reversing switch RS occupies its forward position with the master reverser MR occupying its forward position and that the master controller MC is actuated to its initial operative position $a$, the operation of the system may be set forth as follows: a circuit is first established from the positive terminal of the battery section B2 through conductors 30 and 31, control finger 32, contact segments 33 and 34 and control finger 35 of the interlock drum ID, control finger 8, contact segment 9, and control finger 4 of the master controller MC, and conductor 37 to control finger 24 of the master reverser, from which point a parallel circuit is established, one branch including conductor 39, the field magnet winding F³ of the pilot motor and conductor 40 to a junction point 41 and the other branch including contact segment 38 of the master reverser, control finger 23, conductor 42, armature A2 of the pilot motor, conductor 43, control fingers 21 and 22 which are bridged by contact segment 44 of the master reverser and conductor 45 to the junction point 41, whence circuit is completed through conductor 46 to the negative terminal of the battery section B2. The pilot motor PM is thus energized to actuate the control drum CD to its initial operative position $a'$, whereupon the control circuit of the pilot motor is interrupted by reason of the disengagement of control finger 34 and contact segment 35, and the control drum remains in its position $a'$ until the master controller is further actuated. The drum CD is thus given a positive step-by-step actuation by reason of the intermittent energization of the pilot motor.

Assuming that the control drum CD occupies its position $a'$, a circuit is established from the positive terminal of the battery section B1 through conductor 47, blade 48 of the switch SW and conductor 49, to control finger 50 of the control drum. A parallel circuit is similarly established from the positive terminal of the battery section B2, through conductors 30 and 52, control finger 53, contact segments 54 and 55 and control finger 56 of the control drum and conductor 57 to the control finger 50.

From the control finger 50, a circuit is completed through contact segments 58 and 58ª, control finger 59, conductor 60, control fingers 61 and 62 which are bridged by contact segment 63 of the reversing switch RS, conductor 64, the armature A1 of the vehicle motor, conductor 65, control fingers 66 and 67 which are bridged by contact segment 68 of the reversing switch, conductor 69, control finger 70, contact segments 71 and 72 and control finger 73 of the control drum, conductor 74, the field winding section F2 of the vehicle motor, conductor 75, control finger 76, contact segments 77 and 78 and control finger 79 of the control drum, conductor 80, the resistor R1, conductor 82, the field winding section F1, conductor 83, control finger 84, contact segments 85 and 86 and control finger 87 of the control drum, and conductor 88 to the negative side of the battery section B1. Another circuit is also established from the contact segment 85 of the control drum, through contact segment 89, control finger 90, conductor 91, blade 92 of the switch SW and conductor 93 to the negative terminal of the battery section B2.

The battery sections are thus connected in parallel relation, with the armature and field windings of the vehicle motor and the resistor R1 connected in series relation therewith, as shown in Fig. 2—$a'$.

Assuming the master controller MC is then actuated to its second operative position $b$, the contact segment 9 engages the control fingers 5 and 6, from which points circuits are established through conductors 94 and 95 and control fingers 96 and 97, respectively, to the contact segment 33 of the interlock drum ID in its position $a'$. The pilot motor PM is thus again energized to effect the actuation of the control drum CD to its position $b'$ wherein the control fingers 96 and 97 are disengaged from the contact segment 33 and the control drum comes to rest in that position.

During the movement of the control drum CD from position $a'$ to position $b'$, a contact segment 98 thereof engages control finger 99, whence circuit is completed through conductor 100 to conductor 82. The resistor R1 is thus short-circuited by contact segments 78 and 98, as indicated in Fig. 2—1$a'$.

The control fingers 70 and 73 also break contact with the contact segments 71 and 72 during the movement of the control drum to position $b'$ and other contact segments 101 and 102, respectively, engage the control fingers 70 and 73. In this way, the control finger 70 that is directly connected with the armature A1 of the vehicle motor is connected through contact segment 98 to control finger 99. In addition, the contact segment 77 disengages the control finger 76 and a new contact segment 103 engages the control finger 76, whereby one terminal of the field winding section F1 is connected to the negative terminals of the battery sections. The two field winding sections F1 and F2 are thus connected in parallel circuit relation, as indicated in Fig. 2—$b'$.

If the master controller MC is then moved to its position $c$, a circuit is completed from the contact segment 9, through control finger 7, conductor 104, control finger 105 and contact segment 33 of the interlock drum ID in its position $b'$, whereupon the control drum CD is actuated toward its position $c'$, wherein the contact between control finger 105 and segment 33 is broken to permit the control drum CD to come to rest in that position.

When the control drum passes from position $b'$ toward position $c'$, a circuit is first completed from the contact segment 55 thereof, through contact segment 106, conductor 107, resistor R2, conductor 108, and conductor 88 to the negative terminal of the battery section B1. Also the contact segment 103 disengages the control finger 76. One terminal of the resistor R2 is thus connected to the negative terminals of the battery sections through conductor 88, while the other terminal of the resistor is connected to the positive battery terminals through contact segment 106, 55 and 54 and conductors 52 and 30. The resistor R2 is thus connected in parallel relation with the battery sections B1 and B2, as shown in Fig. 2—1b', and one terminal of the field winding section F2 that is connected to the control finger 76 is disconnected from the remainder of the system as also indicated in Fig. 2—1b', whereby the field winding section G1 only is temporarily active.

The control fingers 87 and 56 next disengage the contact segments 86 and 55, whereby connection between one terminal of the resistor R2 and the conductor 93 and between the other terminal of the resistor R2 and conductor 47 are interrupted, and the resistor R2 is disposed in series circuit relation with the series-connected battery sections, as illustrated in Fig. 2—2b'. Also control finger 76 engages a contact segment 103ª, from which point circuit is completed through contact segments 78 and 98 to the intermediate terminal of the field winding section F1 and the field winding section F2 is temporarily short-circuited, as shown in Fig. 2—2b'.

When the control drum CD reaches the transition position 3b', contact segments 101ª and 102ª are substituted for contact segments 101 and 102, respectively, and the field circuit connections are exactly the same as when contact segments 71 and 72, respectively, engage contact fingers 70 and 73, the field sections being disposed in series relation with the short-circuited resistor R1, as shown in Fig. 2—3b'.

When the control drum CD reaches its position c', control finger 87 engages contact segment 86ª, whereby the resistor R2 is short-circuited through conductors 108 and 88, contact segments 86ª, 54, 55, 106 and control finger 107. The battery sections B1 and B2 are thus disposed in direct series relation, as illustrated in Fig. 2—c'.

When the master controller is actuated to its final operating position d, the contact segment 9 engages the control finger 6, whereby the pilot motor PM is again energized through the interlocking drum in the manner already described, and the control drum CD is actuated to its final operative position d'. In this position, control fingers 70 and 73 disengage contact segments 101ª and 102ª, respectively, and engage contact segments 109 and 110, whereas control finger 76 disengages contact segment 103ª and makes contact with contact 111, thereby effecting the identical field-circuit connections that are illustrated in Fig. 2—b', as again shown in Fig. 2—d', which represents the circuit connections when the vehicle motor has attained its full speed.

For charging the battery sections B1 and B2 from an outside source, the switch SW is thrown to the right in the drawing, provided the controller CD occupies its off position, whereupon a circuit is established from the charging plug CP through conductor 112, blade 48 of the switch SW, conductor 47, the battery section B1 in the charging direction, conductor 88, control finger 87, contact segments 114 and 115 and control finger 53 of the control drum CD in its off position, conductors 52 and 30, the battery section B2, conductor 93, the blade 92 of the switch SW and conductor 116 to the opposite terminal of the charging plug. The battery-charging connections are illustrated in Fig. 2—Charging.

When the master controller MC is moved backwardly from its position d or any of its other "forward" operating positions, the master reverser MR is immediately moved to its reversed position to reverse the connections of the pilot motor and to effect the return of the control drum to its initial position, in the manner already described in connection with Fig. 4.

Assuming that the vehicle is running at a speed suitable for regenerative operation, the master controller MC may be moved through its intermediate position to its initial regenerative position x, whereupon, since the master reverser is reversed, the pilot motor PM is energized through conductor 104 to operate in the reverse direction, and the control drum CD is actuated to its initial regenerative position x'.

A circuit is thereupon established from the positive terminal of the battery section B2 through conductors 30 and 52, control finger 53, contact segments 115 and 114, control finger 87, conductor 88, battery section B1, conductor 47 to the control finger 50 in the manner already set forth, contact segments 117 and 118 of the control drum, control finger 70, conductor 69, control fingers 67 and 66 which are bridged by the contact segment 68 of the reversing switch RS in its forward position, conductor 65, the armature A1 in the reversed direction in accordance with familiar practice, conductor 64, control fingers 62 and 61 that are bridged by contact segment 63 of the reversing switch, conductor 119, resistor R3, conductor 120, control finger 121, contact segments 122 and 123 of the control drum, and conductor 124 to a junction-point 125. One circuit is completed from the junction-point 125, through conductor 126, contact segment 127, control finger 73, thence through the field winding section F2, resistor R1 and the field winding section F1, conductor 83, in that order, in the manner already set forth, to control finger 84, whence circuit is completed through contact segments 127ª and 127ᵇ, control finger 90 and conductor 91 to conductor 93 which is connected to the negative terminal of the battery section B2.

A second circuit is established from the junction-point 125 through conductor 128, contact segment 129 and control finger 138 of the control drum, conductor 131, the battery section BR and conductor 132 to conductor 93.

The battery sections B1 and B2 are thus connected in series circuit relation with the armature A1 in a direction to receive a charge, the resistor R3 is connected in the armature circuit, the resistor R1 is connected in the field circuit, and the battery section BR is connected across the field-winding circuit in a direction to aid in the excitation of the field-winding sections F1 and F2. The circuit connections are such that if the armature current is greater than the current required for exciting the field windings, the surplus current traverses the battery section BR in such a direction as to charge it, as indicated by the dotted arrow in Fig. 3—$x'$, whereas when the armature current is not of a sufficiently high value to suitably excite the field windings, the floating battery section BR discharges in the direction indicated by the solid arrows to supplement the excitation of the field winding.

When the master controller MC is moved to its operative position $y$, the pilot motor is energized through conductor 95 as already described and the control drum CD is actuated to its position $y'$. In this position contact segment 123 engages control finger 59 of the control drum, whereby the resistor R3 is short-circuited through the contact segments 122 and 123, as illustrated in Fig. 3—$y'$.

Upon the actuation of the master controller MC to its final regenerative position $z$, the pilot motor is energized through conductor 104 and the control drum CD is actuated to its final regenerative position $z'$. In this position, a contact segment 133 engages control finger 99 whereby the field-circuit resistor R1 is short-circuited through the contact segments 133 and 134. The final regenerative circuit connections are illustrated in Fig. 3—$z'$.

It should be noted that whereas the control fingers of the master controller MC are used in various sub-combinations in the several operative controller positions and a relatively large proportion—all but finger 8—engage contact segment 9 in the "off" position, the control fingers of the interlock drum ID are generally employed in different pairs during the operation of the drum. Were it not for the above-mentioned arrangement of parts in the "off" position of the master controller, it would be possible to return the master controller to its "off" position so rapidly that the circuit of the pilot motor PM would not be energized through the operative pair of control fingers of the drum ID long enough to effect the return of the control drum CD to its "off" position. However, the arrangement of parts described insures the suitable energization of the pilot motor in the reverse direction, irrespective of the previous position of the control drum CD or of the rapidity of backward movement of the master controller.

It will thus be seen that I provide a switching device wherein the various control fingers are used in different sub-combinations in the successive positions of the master controller MC to perform various desired functions, and in this way, the total number of required control fingers is materially reduced. It will be understood that the principle involved in the construction under consideration may readily be applied to other types of controllers to decrease the cost of manufacture and the size of the apparatus. I also provide means solely dependent upon the usual backward operation of the master controller handle to reverse the pilot motor and thus immediately and automatically return the control drum CD to its initial position.

I do not wish to be restricted to the specific circuit connections and arrangement of parts herein set forth, as various modifications may be made without departing from the spirit and scope of my invention. I desire, therefore, that only such limitations shall be imposed as are indicated in the appended claims.

I claim as my invention:

1. The combination with a multi-position main-circuit switching device, and means for actuating said device, of a multi-position auxiliary switching device having a set of stationary contact members and a contact segment for connecting predetermined sub-combinations thereof in the several operative positions to effect different main circuit connections and for connecting a plurality of said contact members in the "off" position to insure the operation of said actuating means, whereby said main switching device is returned to its off position irrespective of the rapidity of backward movement of the auxiliary switching device.

2. The combination with a multi-position main-circuit switching device and reversible electrical means for actuating said device, of a multi-position controller having a set of stationary control fingers and a coöperating contact segment for bridging predetermined sub-combinations of said fingers in the several positions, and an auxiliary controller movable with said switching device and embodying a plurality of control fingers severally connected to control fingers of said first controller and a contact segment for coöperating with said plurality of fingers to render said electrical actuating means intermittently operative through the respective fingers in the several positions of the switching device, the contact segment of said controller bridging a plurality of the corresponding control fingers when the controller is returned to its "off" position, whereby said electrical-actuating means is energized to return the switching device to "off" position irrespective of the previous position thereof or of the rapidity of backward movement of the controller.

3. A controller for electric motors having a set of $n$ stationary control fingers and having a contact segment adapted to assume $(n+2)$ operative positions in coöperation with said fingers, $(n-1)$ of the fingers being bridged by said segment in its "off" position.

4. The combination with a multi-position switching device, and means for actuating said device, of a multi-position master controller having a set of coöperating stationary contact fingers and a movable contact segment adapted to be used in predetermined sub-combinations in the several controller positions to effect different circuit connections, said contact fingers being less in number than the positions said controller may occupy, and control means movable with said actuating means and electrically associated with said controller to effect a positive step-by-step movement of said actuating means.

5. The combination with a multi-position switching device, and means for actuating said device, of a multi-position controller having a set of stationary control fingers and a coöperating contact segment for bridging predetermined sub-combinations of said fingers in the several positions, said contact fingers being less in number than the positions said controller may occupy, and an auxiliary controller movable with said switching device and embodying a plurality of control fingers severally connected to control fingers of said first controller and a contact segment for coöperating with said plurality of fingers to render said actuating means intermittently inoperative for imparting a positive step-by-step movement to said switching device upon actuation of said first controller through its successive positions.

6. The combination with a multi-position switching device, and means for actuating said device in the one or the other direction, of a controller for governing the operation of said actuating means, said controller comprising one contact segment and a less number of contact fingers than the operative positions thereof, means for effecting the reversal of the actuating means, and means dependent upon predetermined actuation of said controlling means for effecting said reversal.

7. The combination with a multi-position switching device, and electric means for actuating said device in the one or the other direction, of a controller for governing the operation of said electric means, said controller comprising one contact segment and a less number of contact fingers than the operative positions thereof, and means dependent upon a backward movement of said controller for effecting the reversal of said electric means to return said switching device toward its initial position.

8. The combination with a multi-position switching device, and a dynamo-electric machine for actuating said device in the one or the other direction, of a supply circuit, a controller comprising one movable contact segment and a plurality of contact fingers for connecting said machine to said circuit, a reverser for the machine, and friction-operated means dependent upon a backward movement of said controller for actuating said reverser to effect the return of said switching device to its initial position.

9. A controller for electric motors having seven running positions and having five coöperating control fingers, various combinations of said fingers being bridged by said segment in its "off" position and in said running position.

In testimony whereof, I have hereunto subscribed my name this 29th day of April 1915.

LYNN G. RILEY.